(No Model.)
E. C. PHILLIPS.
SKATE CLAMP.
No. 329,944. Patented Nov. 10, 1885.
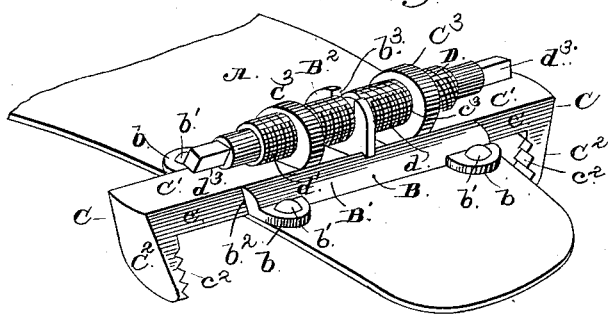
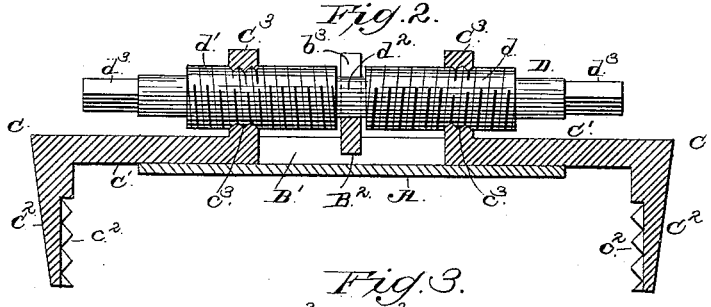
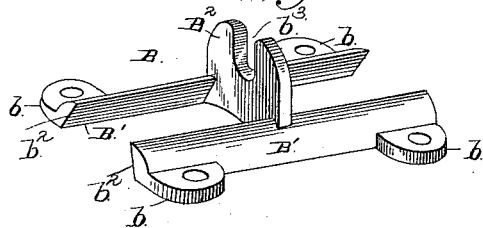
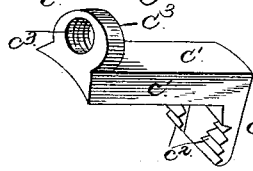
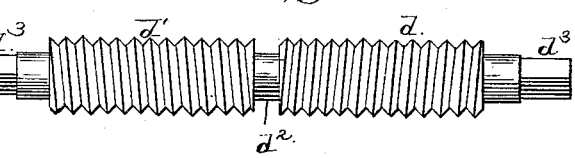
WITNESSES
M. E. Fowler
INVENTOR
Elwood C. Phillips
By
his Attorneys
N. PETERS, Photo-Lithographer, Washington, D. C.